United States Patent
Saini

(10) Patent No.: US 11,631,283 B2
(45) Date of Patent: Apr. 18, 2023

(54) UTILIZING MOBILE VIDEO TO PROVIDE SUPPORT FOR VEHICLE MANUAL, REPAIRS, AND USAGE

(71) Applicant: Toyota Motor North America, Inc., Plano, TX (US)

(72) Inventor: Gagandeep Singh Saini, Plano, TX (US)

(73) Assignee: Toyota Motor North America, Inc., Plano, TX (US)

( * ) Notice: Subject to any disclaimer, the term of this patent is extended or adjusted under 35 U.S.C. 154(b) by 465 days.

(21) Appl. No.: 16/455,574

(22) Filed: Jun. 27, 2019

(65) Prior Publication Data

US 2020/0410781 A1   Dec. 31, 2020

(51) Int. Cl.
```
G07C 5/00      (2006.01)
G07C 5/08      (2006.01)
G07C 5/12      (2006.01)
B60S 5/00      (2006.01)
G06V 20/00     (2022.01)
G10L 15/22     (2006.01)
G06F 40/30     (2020.01)
```

(52) U.S. Cl.
CPC ............... *G07C 5/008* (2013.01); *B60S 5/00* (2013.01); *G06V 20/00* (2022.01); *G07C 5/085* (2013.01); *G07C 5/0808* (2013.01); *G07C 5/12* (2013.01); *G06F 40/30* (2020.01); *G10L 15/22* (2013.01); *G10L 2015/223* (2013.01)

(58) Field of Classification Search
CPC ...... G07C 5/008; G07C 5/085; G07C 5/0808; G07C 5/12; G07C 5/0866; G07C 5/0825; G06K 9/00624; B60S 5/00; G06F 40/30; G10L 2015/223; G10L 15/22; G10L 15/1822
USPC ...................................................... 701/29.6
See application file for complete search history.

(56) References Cited

U.S. PATENT DOCUMENTS 6,141,621 A  * 10/2000 Piwowarski ........... G08G 1/127
                                                      340/989
7,720,680 B2 * 5/2010 Weng .................. G10L 15/1822
                                                      704/235

(Continued)

OTHER PUBLICATIONS

Clay Dillow; BMW Augmented Reality Glasses Help Average Joes Make Repairs; 2 pages; Sep. 3, 2009.

*Primary Examiner* — Krishnan Ramesh
(74) *Attorney, Agent, or Firm* — Snell & Wilmer LLP

(57) ABSTRACT

A system for providing vehicle information to a mobile device includes a network access device to receive a request including image data corresponding to a portion of a vehicle. The system further includes a memory to store content related to vehicles. The system further includes a processor designed to identify a model of the vehicle based on the request for the vehicle information and to identify the portion of the vehicle based on the request for the vehicle information. The processor is further designed to determine a type of information requested based on the request for the vehicle information and to identify applicable content from the memory based on the identified model of the vehicle, the identified portion of the vehicle, and the identified type of information requested. The processor is further designed to control the network access device to transmit the applicable content to the remote device.

20 Claims, 11 Drawing Sheets

(56) References Cited

U.S. PATENT DOCUMENTS

| | | | | |
|---|---|---|---|---|
| 8,131,417 B2* | 3/2012 | Picard | G06Q 10/06 | 701/29.1 |
| 8,650,068 B2* | 2/2014 | Esser | G06Q 30/02 | 705/7.35 |
| 8,825,270 B2* | 9/2014 | Chen | G07C 5/0808 | 701/29.6 |
| 9,552,519 B2* | 1/2017 | Gurovich | G06F 16/583 | |
| 9,684,903 B2* | 6/2017 | Connolly | G06Q 30/016 | |
| 9,805,263 B2* | 10/2017 | Schneider | G06K 9/2027 | |
| 9,824,453 B1* | 11/2017 | Collins | G06Q 40/08 | |
| 9,990,661 B2* | 6/2018 | Taylor | G06Q 30/0611 | |
| 10,360,601 B1* | 7/2019 | Adegan | G06Q 30/0283 | |
| 10,902,525 B2* | 1/2021 | Kelsh | G06Q 40/08 | |
| 2002/0007237 A1* | 1/2002 | Phung | G05B 23/0216 | 701/31.4 |
| 2002/0161493 A1* | 10/2002 | Bird | G05B 23/0264 | 701/33.4 |
| 2005/0108281 A1* | 5/2005 | Kim | G06F 40/30 | |
| 2005/0125117 A1* | 6/2005 | Breed | G07C 5/008 | 701/31.5 |
| 2006/0271246 A1* | 11/2006 | Bell | G08G 1/20 | 701/1 |
| 2007/0040706 A1* | 2/2007 | Alrabady | G06F 21/6209 | 340/991 |
| 2007/0093924 A1* | 4/2007 | Engel | G05B 23/0267 | 700/104 |
| 2007/0093947 A1* | 4/2007 | Gould | G07C 5/008 | 701/31.5 |
| 2009/0271665 A1* | 10/2009 | Stocker | H04L 43/106 | 714/48 |
| 2010/0023203 A1* | 1/2010 | Shibi | G07C 5/0808 | 701/31.4 |
| 2010/0076644 A1* | 3/2010 | Cahill | G07C 5/0808 | 701/31.4 |
| 2010/0185638 A1* | 7/2010 | Wright | G06F 16/5838 | 707/758 |
| 2011/0112932 A1* | 5/2011 | Chen | G06Q 30/06 | 705/27.1 |
| 2013/0046592 A1* | 2/2013 | Ross | H04M 1/72454 | 705/14.4 |
| 2013/0124032 A1* | 5/2013 | Singh | G05B 23/0278 | 701/29.4 |
| 2013/0196294 A1* | 8/2013 | Lakshmanaperumal | G09B 5/06 | 434/219 |
| 2013/0325541 A1* | 12/2013 | Capriotti | G06Q 10/087 | 705/7.21 |
| 2015/0052018 A1* | 2/2015 | O'Conner | G06Q 30/0623 | 705/26.61 |
| 2015/0116103 A1* | 4/2015 | Yang | G08B 1/08 | 340/438 |
| 2016/0063774 A1* | 3/2016 | Afshar | A47L 1/06 | 701/29.1 |
| 2016/0078403 A1* | 3/2016 | Sethi | G06Q 10/0875 | 705/26.81 |
| 2016/0180607 A1* | 6/2016 | Wittliff | G07C 5/008 | 701/31.4 |
| 2016/0189440 A1* | 6/2016 | Cattone | G07C 5/008 | 701/31.5 |
| 2016/0253563 A1* | 9/2016 | Lam | G06F 11/0748 | 348/130 |
| 2017/0017667 A1* | 1/2017 | Chen | G06T 7/337 | |
| 2017/0084087 A1* | 3/2017 | Liu | G10L 15/22 | |
| 2017/0148102 A1* | 5/2017 | Franke | G06Q 30/0278 | |
| 2017/0262815 A1* | 9/2017 | Shipman | G06Q 10/20 | |
| 2017/0301154 A1* | 10/2017 | Rozint | G06Q 10/20 | |
| 2018/0089912 A1* | 3/2018 | Penilla | G06Q 10/06314 | |
| 2018/0096539 A1* | 4/2018 | Merg | G06F 16/24564 | |
| 2018/0197355 A1* | 7/2018 | Remboski | G07C 5/0808 | |
| 2018/0293664 A1* | 10/2018 | Zhang | G06Q 40/08 | |
| 2018/0315260 A1* | 11/2018 | Anthony | G06N 20/00 | |
| 2019/0019335 A1* | 1/2019 | Elangovan | G06T 7/70 | |
| 2019/0221049 A1* | 7/2019 | Lopez Rubio | G09B 19/00 | |
| 2019/0272362 A1* | 9/2019 | Thorley | H04L 63/0861 | |
| 2019/0304208 A1* | 10/2019 | Chen | B60Q 9/00 | |
| 2019/0311555 A1* | 10/2019 | Troy | H04N 5/23296 | |
| 2019/0392401 A1* | 12/2019 | Bellini | G06Q 10/20 | |
| 2020/0226855 A1* | 7/2020 | Liu | G07C 5/0825 | |
| 2020/0226858 A1* | 7/2020 | Fujisawa | G01R 31/007 | |
| 2020/0327743 A1* | 10/2020 | Cannarsa | H04M 1/6041 | |
| 2020/0410781 A1* | 12/2020 | Saini | G07C 5/085 | |

* cited by examiner

UTILIZING MOBILE VIDEO TO PROVIDE SUPPORT FOR VEHICLE MANUAL, REPAIRS, AND USAGE

BACKGROUND

1. Field

The present disclosure relates to systems and methods for providing vehicle information to a mobile device based on image data captured by the mobile device.

2. Description of the Related Art

Vehicles may include many systems and components. It may be relatively difficult for many people to learn to use all of these systems, to diagnose issues with the vehicle, or to repair the vehicle. In order to learn to use vehicular systems, users may access a user manual. However, this may be a tedious process due to the length of some of these manuals and the difficulty in finding the correct locations in the manuals. In addition, diagnosing vehicle issues may be challenging. Such diagnosis may be performed by taking the vehicle to a mechanic. However, such a diagnosis may be relatively expensive and unnecessary. Repair or replacement of vehicle parts may likewise be difficult. Some skilled individuals may be capable of teaching themselves how to repair vehicles, but this may be tedious and frustrating process.

Therefore, there is a need for systems and methods for providing information to a mobile device corresponding to learning how to use vehicular systems, diagnosing vehicle issues, and repairing vehicle components.

SUMMARY

Described herein is a system for providing vehicle information to a mobile device. The system includes a network access device designed to receive a request for the vehicle information that includes image data corresponding to a portion of a vehicle from a remote device. The system further includes a memory designed to store content related to vehicles. The system further includes a processor coupled to the network access device and the memory. The processor is designed to identify a model of the vehicle based on the request for the vehicle information. The model of the vehicle may be identified by scanning a VIN from the windshield section of the vehicle or the driver door panel of the vehicle. The processor is further designed to identify the portion of the vehicle based on the request for the vehicle information. The processor is further designed to determine a type of information requested based on the request for the vehicle information. The processor is further designed to identify applicable content from the memory based on the identified model of the vehicle, the identified portion of the vehicle, and the identified type of information requested. The processor is further designed to control the network access device to transmit the applicable content to the remote device.

Also disclosed is a system for providing vehicle information to a mobile device. The system includes a network access device designed to receive a request for the vehicle information that includes image data corresponding to a portion of a vehicle and word data including at least one of text data or audio speech data from a remote device. The system further includes a memory designed to store content related to vehicles. The system further includes a processor coupled to the network access device and the memory. The processor is designed to identify a model of the vehicle based on the request for the vehicle information. The processor is further designed to identify the portion of the vehicle based on the request for the vehicle information. The processor is further designed to determine a type of information requested based on the request for the vehicle information. The processor is further designed to identify applicable content from the memory based on the identified model of the vehicle, the identified portion of the vehicle, and the identified type of information requested. The processor is further designed to control the network access device to transmit the applicable content to the remote device.

Also disclosed is a method for providing vehicle information to a mobile device. The method includes receiving, from a remote device, a request for the vehicle information that includes image data corresponding to a portion of a vehicle. The method further includes storing, in a memory, content related to vehicles. The method further includes identifying, by a processor, a model of the vehicle based on the request for the vehicle information. The method further includes identifying, by the processor, the portion of the vehicle based on the request for the vehicle information. The method further includes determining, by the processor, a type of information requested based on the request for the vehicle information. The method further includes identifying, by the processor, applicable content from the memory based on the identified model of the vehicle, the identified portion of the vehicle, and the identified type of information requested. The method further includes controlling, by the processor, a network access device to transmit the applicable content to the remote device.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing vehicle information to a user of a mobile device based on a request that includes image data of the vehicle. The systems provide several benefits and advantages such as decreasing an amount of time that it takes users to learn how to use systems of their vehicles, such as navigation, head units, or the like. The systems provide additional benefits such as easing the burden of vehicle owners trying to diagnose problems with their vehicles. The systems also advantageously quickly provide instructions for repairing or replacing damaged vehicle components, potentially reducing costs experienced by vehicle owners. These benefits make vehicle ownership and repair easier for individuals, thus incentivizing individuals to purchase vehicle for which the system and methods are applicable.

An exemplary system includes a mobile device to capture image data corresponding to a portion of a vehicle. The system further includes a server which may include a network access device to receive the image data and to transmit content to the mobile device. The server may further include a memory to store the content, and a processor. The processor may analyze the image data to identify a make and model of the vehicle in the image data, as well as to identify the portion of the vehicle captured in the video. The processor may also determine what type of information is requested based on the image data. Based on the information requested and the make, model, and portion of the vehicle, the processor may identify applicable content in the memory, and may control the network access device to transmit the content to the mobile device.

Figure 1:
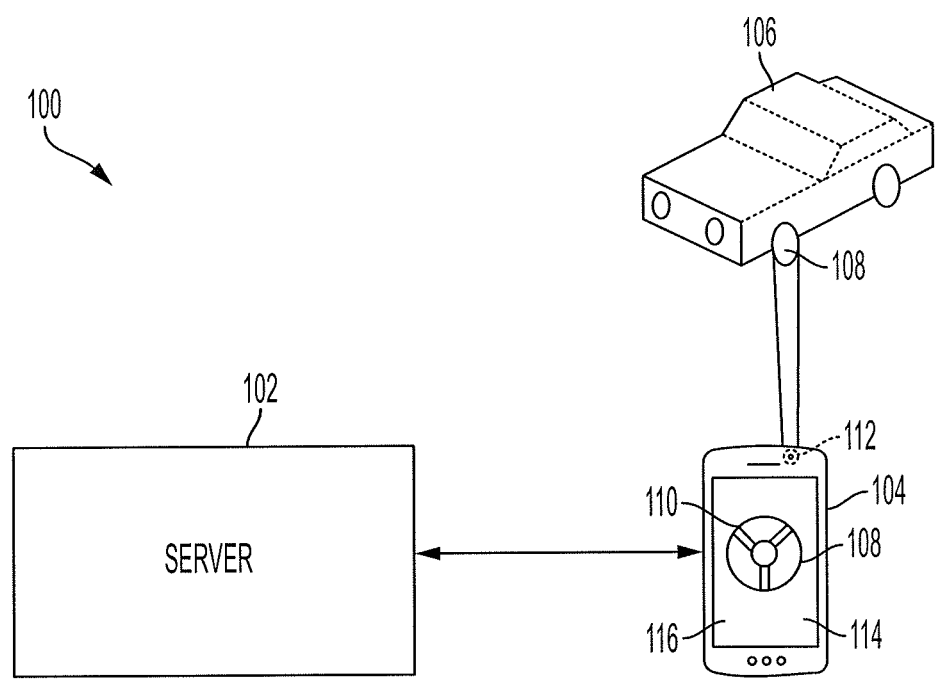
FIG. 1 is a block diagram illustrating a system for providing vehicle information to a mobile device according to an embodiment of the present invention.

Referring to FIG. 1, a system 100 for providing vehicle information to a mobile device based on information received by the mobile device is shown. The system 100 includes a server 102, a mobile device 104, and a vehicle 106. The mobile device 104 may include various components including a camera 112, an input device 114, and an output device 116. The camera 112 may include any camera capable of detecting image data. The input device 114 may include any input device capable of receiving user input. For example, the input device 114 may include a button, a touchscreen, a keypad, a microphone, or the like. The output device 116 may include any output device such as a display, a speaker, a touchscreen, or the like. In the example illustrated in FIG. 1, the mobile device 104 includes a touchscreen as the input device 114 and the output device 116.

The mobile device 104 may be utilized to capture image data of a portion of the vehicle 106. In the example illustrated in FIG. 1, the camera 112 is capturing image data 110 corresponding to a wheel 108 of the vehicle 106. The image data 110 may include one or more still photograph, one or more video (with or without audio capture), or the like. In some embodiments, a user may provide word data (spoken words or typed text). The image data 110 and the word data may correspond to a request for vehicle information.

The request for vehicle information may be transmitted to the server 102 by the mobile device 104. The server 102 may be capable of identifying content related to the request for vehicle information. For example, the server 102 may be capable of identifying a make and model of the vehicle 106. The server 102 may further be capable of identifying the portion of the vehicle (i.e., the wheel 108) that corresponds to the request for vehicle information. The server 102 may also determine a type of information requested based on one or more of the image data 110 or the word data. The server 102 may also identify applicable content either stored on the server 102 or stored on remote servers or databases, and may transmit the applicable content to the mobile device 104. The mobile device 104 may then output the applicable content.

Figure 2:
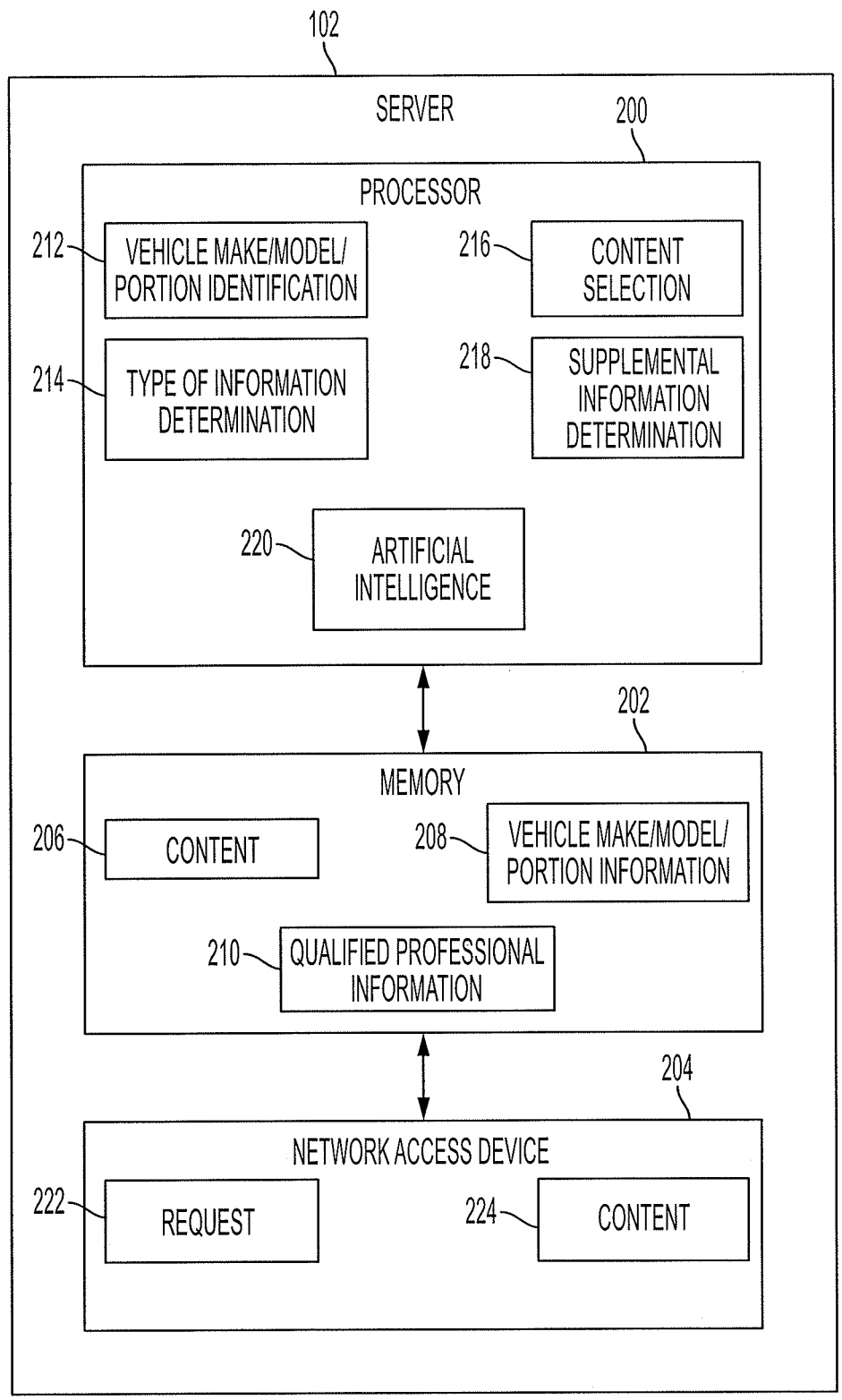
FIG. 2 is a block diagram illustrating features of a server used in the system of FIG. 1 according to an embodiment of the present invention.

Turning now to FIG. 2, additional details of the server 102 are shown. In particular, the server 102 may include a processor 200, a memory 202, and a network access device 204.

The processor 200 may include a logic device such as one or more of a central processing unit (CPU), an accelerated processing unit (APU), a digital signal processor (DSP), a field programmable gate array (FPGA), an application specific integrated circuit (ASIC), or the like.

The processor 200 may be designed to perform various functions or algorithms. In particular, the processor 200 may be capable of performing a vehicle make/model/portion identification algorithm 212. The algorithm 212 may receive at least one of image data or word data from the mobile device and may analyze the image data and/or the word data to identify a make and a model of the vehicle as well as the portion of the vehicle for which the information is requested. In the example illustrated in FIG. 1, the algorithm 212 may identify the make and model of the vehicle 106 and may identify that the wheel 108 is the portion of the vehicle for which the information is requested.

The processor 200 may further be capable of performing a type of information determination algorithm 214. The type of information determination algorithm 214 may analyze the image data and/or the word data to determine a type of information requested in the request for vehicle information. For example, if the image data indicates that a tire is flat then the type of information determination algorithm 214 may determine that the request corresponds to a request for content related to fixing a flat tire including how to patch a flat tire and how to replace a flat tire with a spare tire.

The processor 200 may further be capable of performing a content selection algorithm 216. The content selection algorithm 216 may be designed to access the memory 202 in order to identify content which may be applicable to the request for vehicle information. For example, after the processor 200 identifies the make, model, and portion of the vehicle included in the request for vehicle information and determines the type of information requested, the processor 200 may search the memory 202 for content applicable to the make, model, and portion of the vehicle. Continuing the example of the flat tire, the content selection algorithm 216 may select content related to patching a flat tire and replacing a flat tire with a spare tire.

The processor 200 may also be capable of performing a supplemental information determination algorithm 218. The algorithm 218 may determine whether additional information is needed to complete any of the algorithms 212, 214, 216. For example, if the processor 200 fails to identify the make, model, or portion of the vehicle included in the request for vehicle information then the algorithm 218 may determine that additional word data or additional image data is necessary to identify the make, model, or portion of the vehicle. In some embodiments, the algorithm 218 may determine specific image data or word data that would aid in providing the additional information, and may output instructions requesting the specific image data or word data.

In some embodiments, the processor 200 may be an artificial intelligence processor capable of performing an artificial intelligence algorithm 220. The artificial intelligence algorithm 220 may perform some or all of the functions of one or more of the algorithms 212, 214, 216, 218. The artificial intelligence algorithm 220 may be trained with historical data or may be trained as the server 102 is being used. In some embodiments, the algorithms 212, 214, 216, 218 may operate as non-artificial intelligence algorithms and may or may not be capable of self-improvement or optimization of such algorithms.

The memory 202 may include any non-transitory memory capable of storing data. For example, the memory 202 may store at least one of information requested by the processor, information programmed into the memory 202 by a user or other device, or instructions usable by the processor to perform one or more algorithms.

The memory 202 may be designed to store various pieces of content 206. The content 206 may relate to vehicles and may include information such as how-to videos, schematic diagrams, user manuals, or the like. Each piece of content 206 may be associated with a specific make, model, or portion of a vehicle, and may or may not be associated with a type of information requested. In that regard, the content selection algorithm 216 may access the content 206 to select content that is applicable to the request for vehicle information.

The memory 202 may further store vehicle make/model/portion information 208. The information 208 may include information such as word data, image data, or the like that the processor 200 may compare the request for vehicle information to in order to identify the vehicle make, model, or portion. For example, the information 208 may include image data of a wheel and may include an identifier of the wheel and the make and model of the vehicle. In that regard, the processor 200 may identify that the portion of the vehicle is the wheel as well as identify the make and model of the vehicle by comparing the image data to the information 208.

The memory 202 may further store qualified professional information 210. The qualified professional information 210 may include names of individuals or organizations as well as contact information for the individuals or organizations who are qualified to repair vehicles. The qualified professional information 210 may further include information such as specialties of the professionals (i.e., whether the professionals have a specialty in vehicle body repair or tire repair), whether the professionals are authorized by the vehicle manufacturer, or the like. The qualified professional information 210 may further include pricing information for the professionals, user or manufacturer sourced ratings of the professionals, pricing information for certain vehicle parts, or the like.

The network access device 204 may include any network access device capable of communicating via a wired or wireless protocol. For example, the network access device 204 may communicate via Ethernet, USB, Bluetooth, Wi-Fi, a cellular protocol, vehicle to vehicle (V2V) communications, Zigbee, or any other wired or wireless protocol. The network access device 204 may communicate with the mobile device 104 of FIG. 1 in order to receive a request for vehicle information 222 from the mobile device 104 and to transmit the applicable content 224 to the mobile device 104.

Figure 3A:
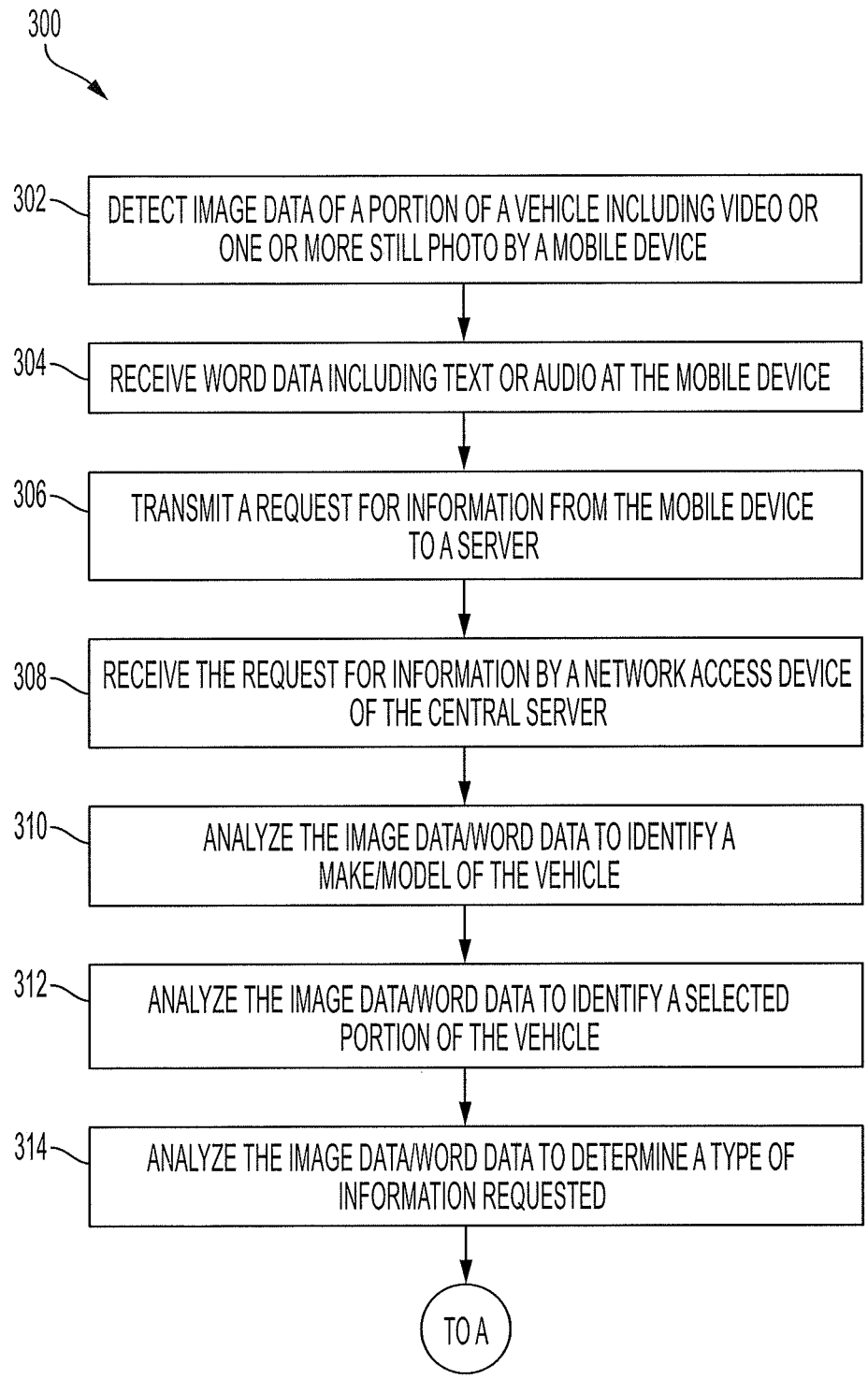
FIGS. 3A and 3B are flowcharts illustrating a method for providing vehicle information to a mobile device according to an embodiment of the present invention.
Figure 3B:
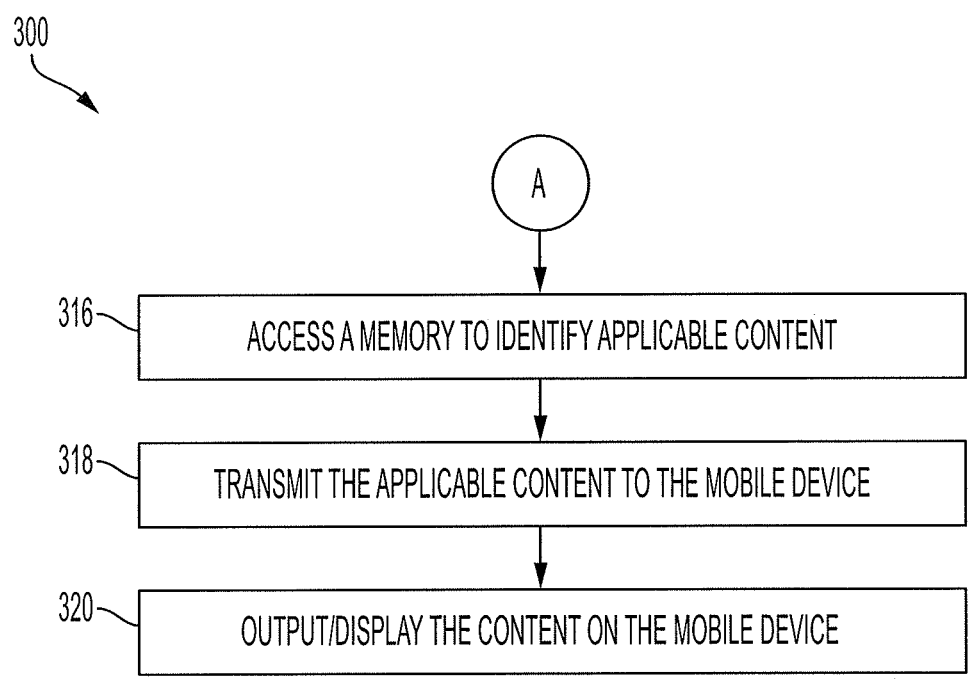

Referring now to FIGS. 3A and 3B, a method 300 for providing vehicle information to a mobile device is shown. The method 300 may be performed, for example, by a system similar to the system 100 of FIG. 1.

In block 302, a camera of a mobile device may detect image data corresponding to a portion of a vehicle. The image data may include one or more of video or still photographs. For example, a user may orient the camera towards a desired portion of the vehicle and may use an input device to indicate when the image data should be captured.

In block 304, the mobile device may receive word data. The words data may include one or more of text or audio. For example, a user may speak or type words such as "show me how to fix this," "how do I operate the navigation," "how do I change a tire," or the like.

A user may provide the information in blocks 302 and 304 by using an app on the mobile device. For example, the app may be a vehicle information app which may be generic and applicable to any vehicle manufacturers or may be provided specifically by a particular vehicle manufacture.

In block 306, the mobile device may transmit a request for information to a server. The request for information may include the image data and the word data, if any word data is provided.

Blocks 308-318 may be performed by the server. In some embodiments, some or all of these blocks (308-318) may be performed by the mobile device instead of the server, or the server and mobile device may together perform some blocks, without departing from the scope of the present disclosure.

In block 308, a network access device of the server may receive the request for vehicle information.

In block 310, a processor of the server may analyze the image data and the word data included within the request for information in order to identify a make and a model of the vehicle.

In block 312, the processor may analyze the image data and the word data to identify a selected portion of the vehicle corresponding to the request for information.

In block 314, the processor may analyze the image data and the word data determine a type of information requested in the request for information.

In block 316, the processor may access a memory to identify content that is applicable to the request for information. The memory may be located on the server, may be remote, or may be a combination of local and remote memory. The content may be associated with the make and model of the vehicle, along with the portion of the vehicle and the type of information requested. For example, the image data may correspond to a navigation system of the vehicle. The processor may identify the make and model of the vehicle and may identify the navigation system as the portion of the vehicle based on the image data. The processor may further determine that the type of information requested includes an instruction set for operating the navigation system. As another example, the processor may determine that a screen of the navigation system is cracked. The processor may determine that the type of information is repair instructions or contact information for qualified professionals capable of fixing the cracked screen. The processor may access content that satisfies this information.

In block 318, the network access device of the server may transmit the applicable content to the mobile device.

In block 320, the mobile device may output or display the content received from the server. For example, the content may include image data, audio data, or both, and the mobile device may output the content using a display, a speaker, or both.

Figure 4:
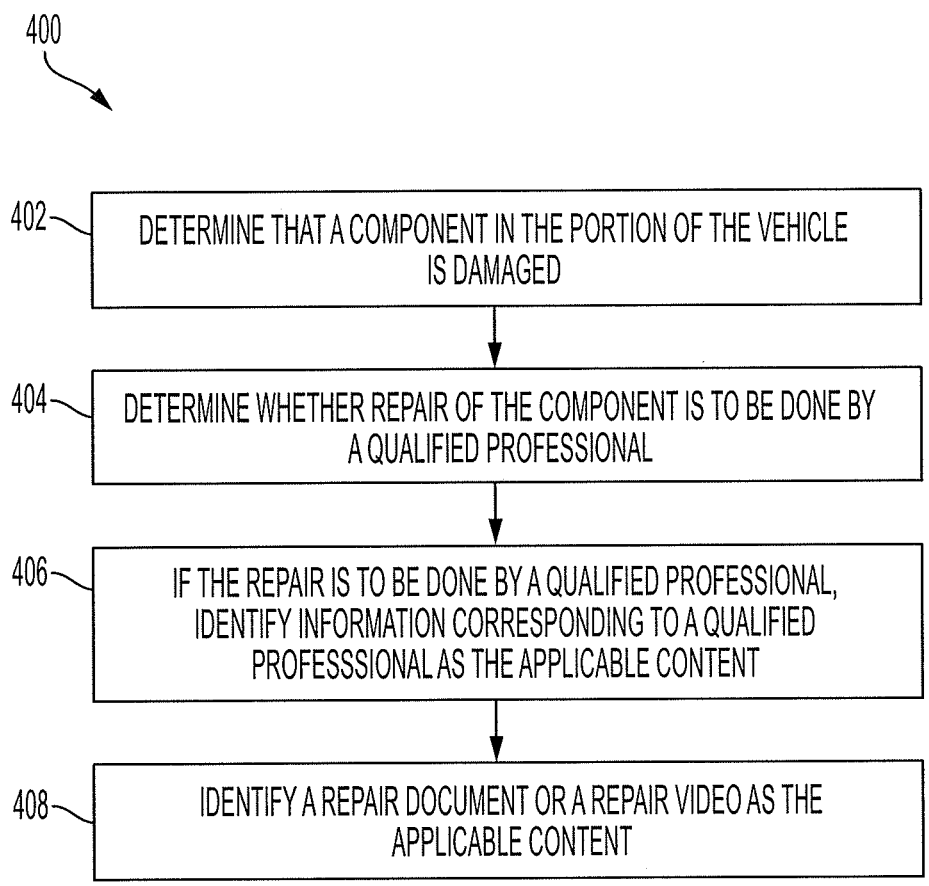
FIG. 4 is a flowchart illustrating a method for providing repair information as applicable content to a mobile device according to an embodiment of the present invention.

Turning now to FIG. 4, a method 400 for providing repair information to a mobile device is shown. The method 400 may be used in conjunction with the method 300 of FIGS. 3A and 3B.

In block 402, the processor of the server may determine that a component in the portion of the vehicle is damaged. The processor may make this determination based on the image data, the word data, or both. For example, the word data may include words such as "the screen is broken," "how do I fix this," or the like. As another example, the processor may analyze the image data and identify that a component is broken. For example, the image data may indicate a crack in a screen, a mirror in a position in which it is not designed to be, or the like.

In block 404, the processor may determine whether repair of the component is to be done by a qualified professional or whether such repair may be performed by an individual vehicle owner. For example, the processor may be programmed to identify which types of damage and to which components it is desirable to use a qualified professional, and which types of damage and to which components an individual vehicle owner is capable of repairing without increasing the likelihood of further vehicle damage. In that regard, a memory may store data indicating which types of damage and which components should be repaired by qualified professionals.

In block 406, if the repair is to be done by a qualified professional, then the processor may identify information corresponding to qualified professionals as the applicable content. For example, the information may include names, contact information, specialties, or the like of one or more qualified professional capable of repairing the damaged component.

In block 408, if the repair can be performed by an individual vehicle owner (e.g., without significant risk of further damage to the vehicle) then the processor may identify a repair document or a repair video as the applicable content. The repair document or the repair video may include directions regarding how to repair the damage.

Figure 5:
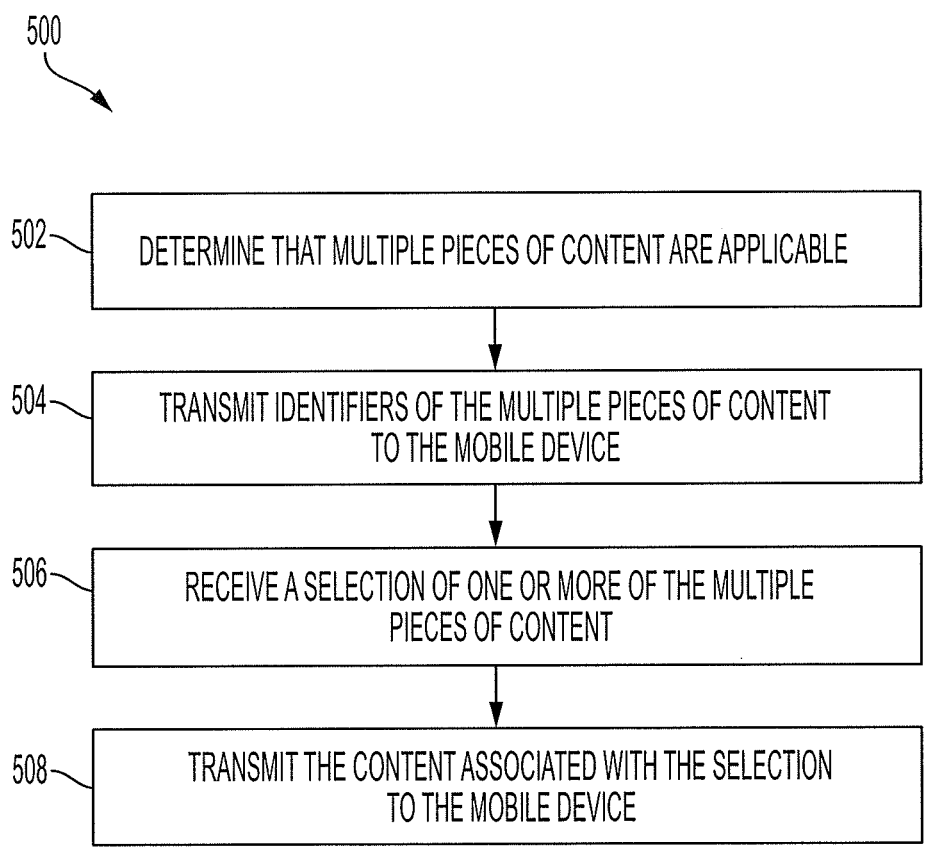
FIG. 5 is a flowchart illustrating a method for identifying a selected piece of applicable content from multiple pieces of applicable content according to an embodiment of the present invention.

Turning now to FIG. 5, a method 500 for managing a situation in which multiple pieces of content match a request for vehicle information is shown. The method 500 may be performed in conjunction with the method 300 of the FIGS. 3A and 3B.

In block 502, the processor may identify multiple pieces of content that are applicable to the request for vehicle information. For example, the processor may identify that a tire of a vehicle is flat based on the request for vehicle information. Based on this determination, the processor may identify multiple pieces of content including a video for replacing a tire, a video for repairing a tire, a how-to document for replacing a tire, or the like.

In some embodiments, the processor may transmit each of the pieces of content to the user. In some embodiments, the processor may select a top-rated piece of content and send only that content to the user. In some embodiments, the user may request a different piece of content and the processor may transmit one or more additional pieces of content to the user.

In block 504, the processor may control the network access device to transmit identifiers (which may include descriptions) of the multiple pieces of content to the mobile device. The mobile device may output the identifiers using an output device and may receive a selection of one of the pieces of content.

In block 506, the processor may receive a selection of one or more of the pieces of content from the mobile device.

In block 508, the processor may control the network access device to transmit the content that is associated with the selection to the mobile device. The mobile device may then output the selected content.

Figure 6:
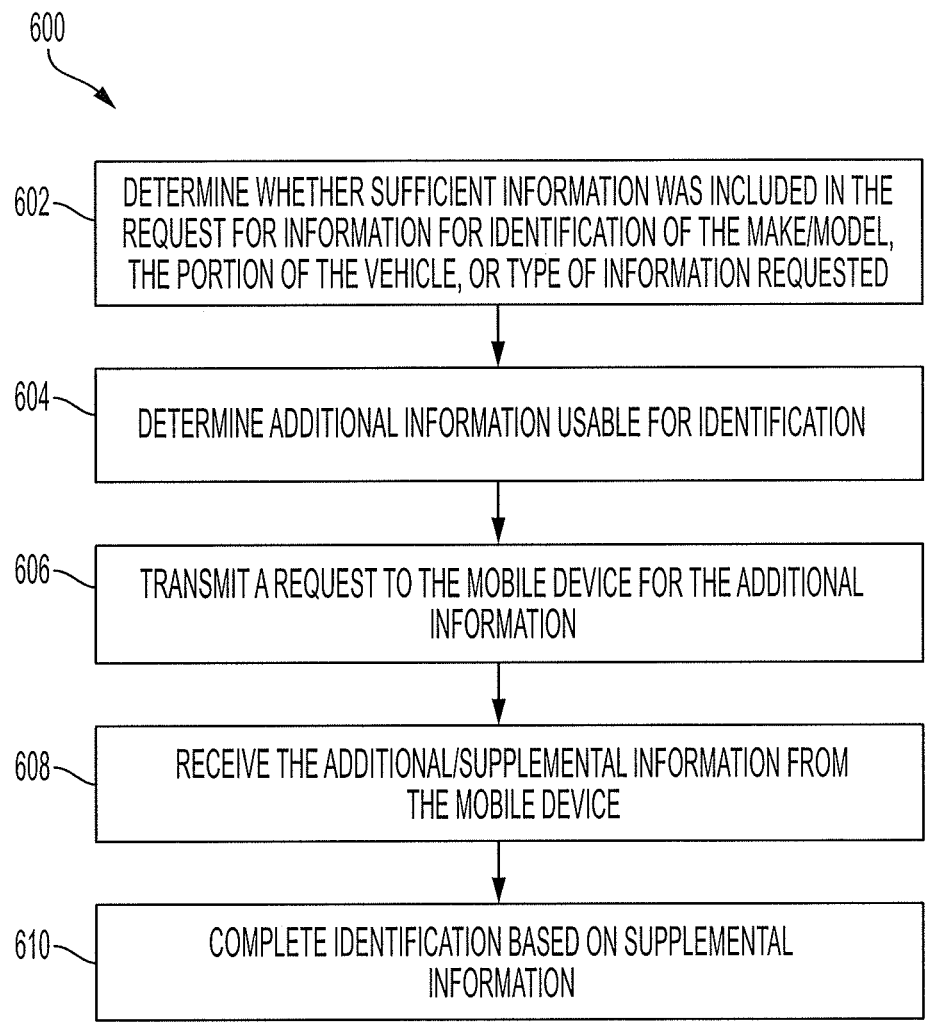
FIG. 6 is a flowchart illustrating a method for receiving supplemental information as part of a request for vehicle information according to an embodiment of the present invention.

Turning now to FIG. 6, a method 600 for requesting supplemental information is shown. The method 600 may be performed in conjunction with the method 300 of FIGS. 3A and 3B.

In block 602, the processor may determine whether sufficient information was included in the request for information. For example, if the processor is incapable of identifying the make of the vehicle, the model of the vehicle, the selected portion of the vehicle, or the type of information requested then the processor may determine that insufficient information was included in the request.

In some embodiments and in block 604, the processor may determine additional information which may be usable to complete any identifications or determinations. For example, the processor may determine that additional image data of an engine may be used to identify a location of the leak. As another example, if the image data includes images that include air conditioning controls and a navigation unit, then the processor may determine that word data, indicating for which of the air conditioning controls or the navigation unit information is requested, would help in identifying the portion of the vehicle.

In block 606, the processor may transmit a request to the mobile device indicating which additional information is requested.

In block 608, the server may receive additional or supplemental information from the mobile device. The additional or supplemental information may include the information requested in block 606.

In block 610, the processor may complete the identification or determination based on the supplemental information.

Figure 7:
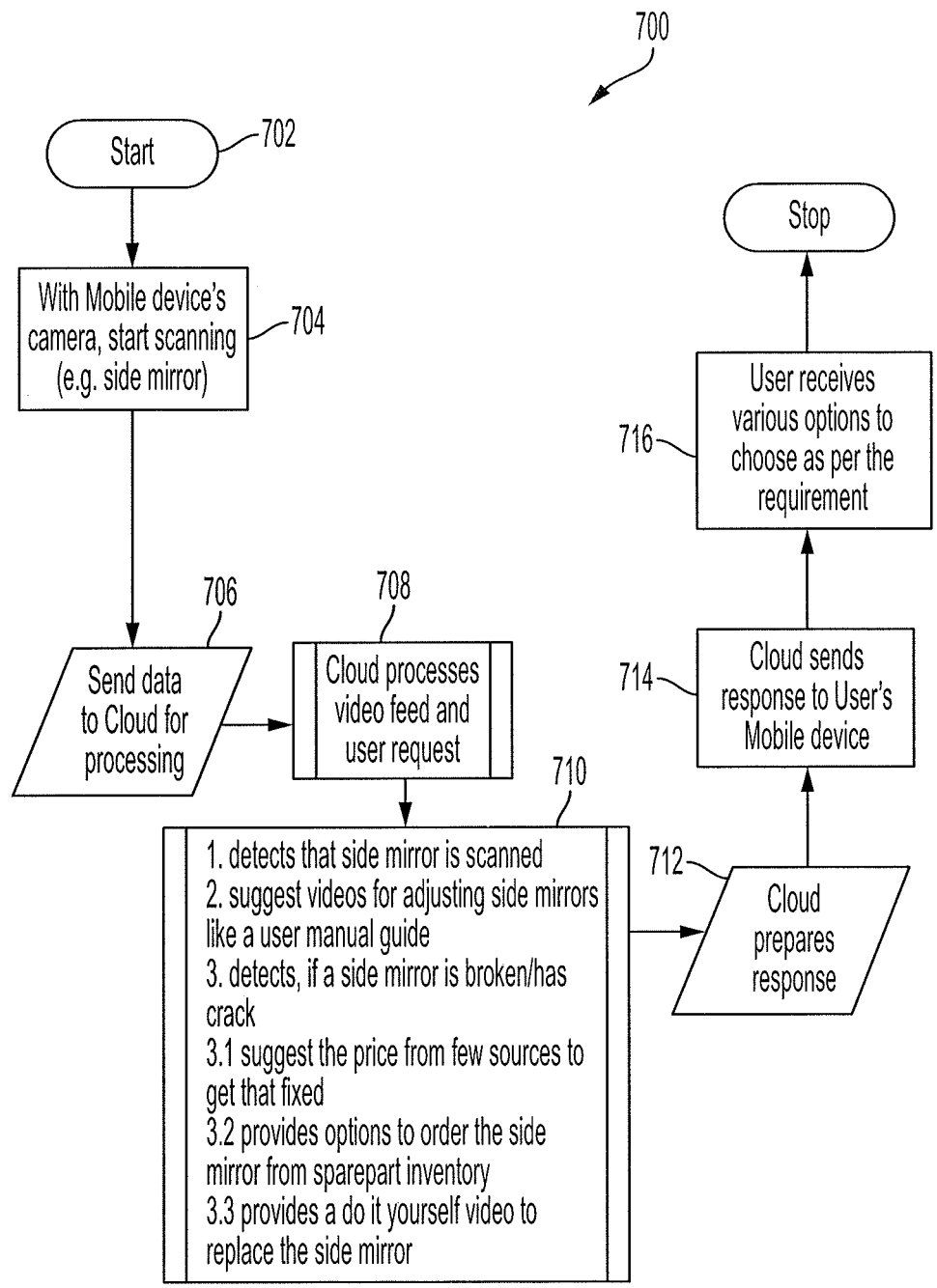
FIGS. 7, 8, 9, and 10 are flowcharts illustrating example implementations of the method of FIGS. 3A and 3B according to an embodiment of the present invention.

Turning now to FIG. 7, a method 700 may be performed as an exemplary implementation of the method 300 of FIGS. 3A and 3B. The method 700 may begin in block 702.

In block 704, a mobile device may be controlled to detect image data corresponding to a portion of a vehicle, such as a side view mirror. In block 706, the mobile device may transmit the detected image data to a server, such as a cloud server.

In block 708, a processor of the server may process the image data and any word data included there with to identify the vehicle make, model, and portion along with the type of information requested.

In block 710, the server may determine that the image data corresponds to a side mirror. The server may further identify videos relating to adjusting side mirrors as the applicable content. The server may further determine whether the side mirror is broken or cracked. The server may then determine or otherwise identify a price for repairing the mirror along with identifiers of qualified professionals as the applicable content. The server may further provide options for ordering a replacement side mirror, such as from Amazon or another online retailer. The server may also provide an instruction video for replacing the side mirror.

In block 712, the server may generate a response including the applicable content. In block 714, the server may send the response to the mobile device.

In block 716, the mobile device may output the identifiers of the pieces of content, or may output the content itself. In some embodiments, the mobile device may receive a selection of a piece of content, may transmit the selection to the server, and the server may transmit the selected content back to the mobile device.

Figure 8:
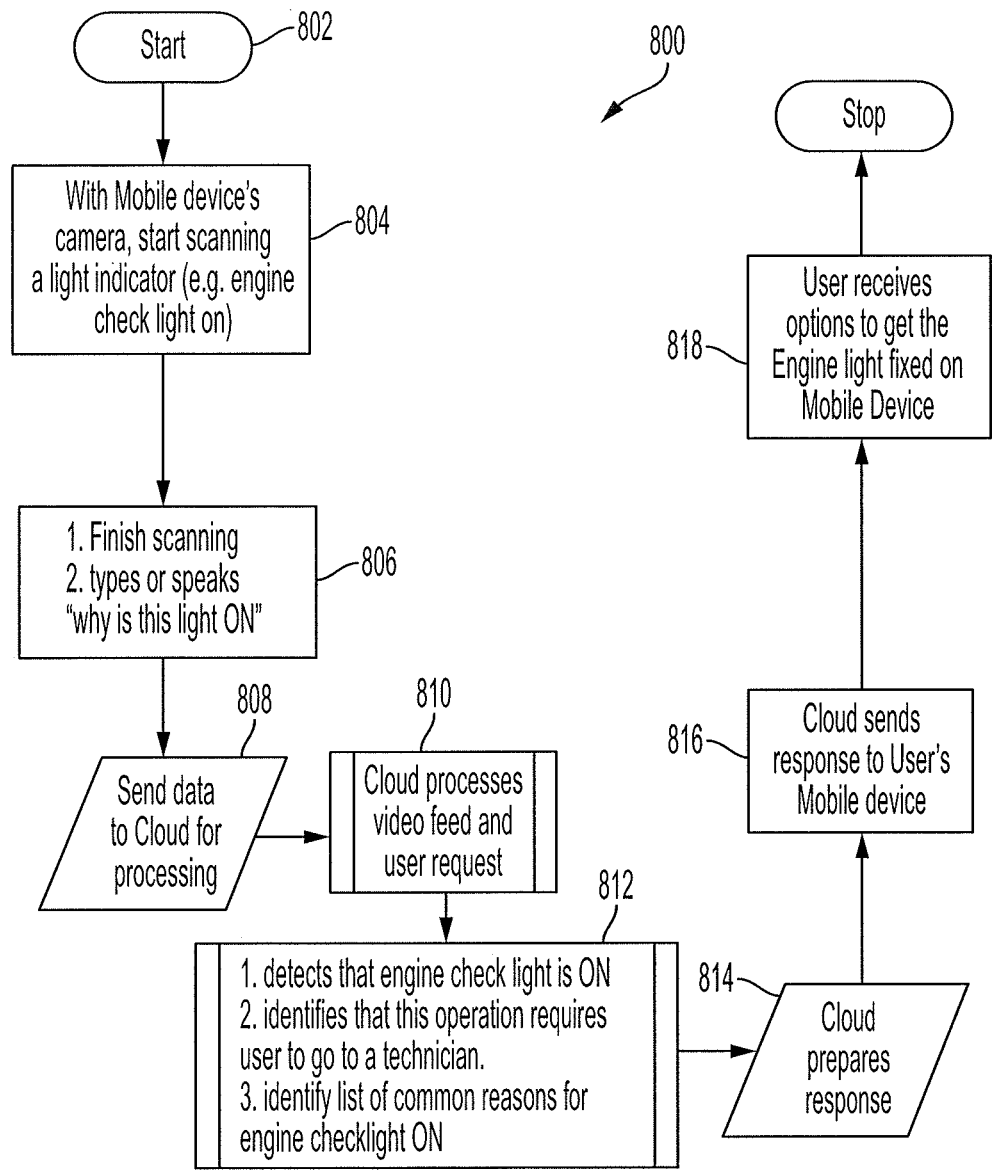

Turning now to FIG. 8, another method 800 may also be performed as an example implementation of the method 300 of FIGS. 3A and 3B. The method 800 may begin and block 802.

In block 804, a mobile device may detect image data corresponding to a check engine light on a dashboard. In block 806, the user may further provide word data including "why is this light on?" In block 808, the mobile device may transmit the image data and the word data to a server, such as a cloud server.

In block 810, the server may process the image data and the word data.

In block 812, the server may determine that the check engine light is on based on the image data and may determine that the information requested is an answer as to why the check engine light is on. The server may further identify that a trip to an authorized professional may be required in order to answer the question. The server may also identify a list of potential reasons why the check engine light may be on.

In block 814, the server may prepare a response including the applicable content. In block 816, the server may transmit the prepared response to the mobile device of the user. In block 818, the mobile device may receive the applicable content and may output the applicable content.

Figure 9:
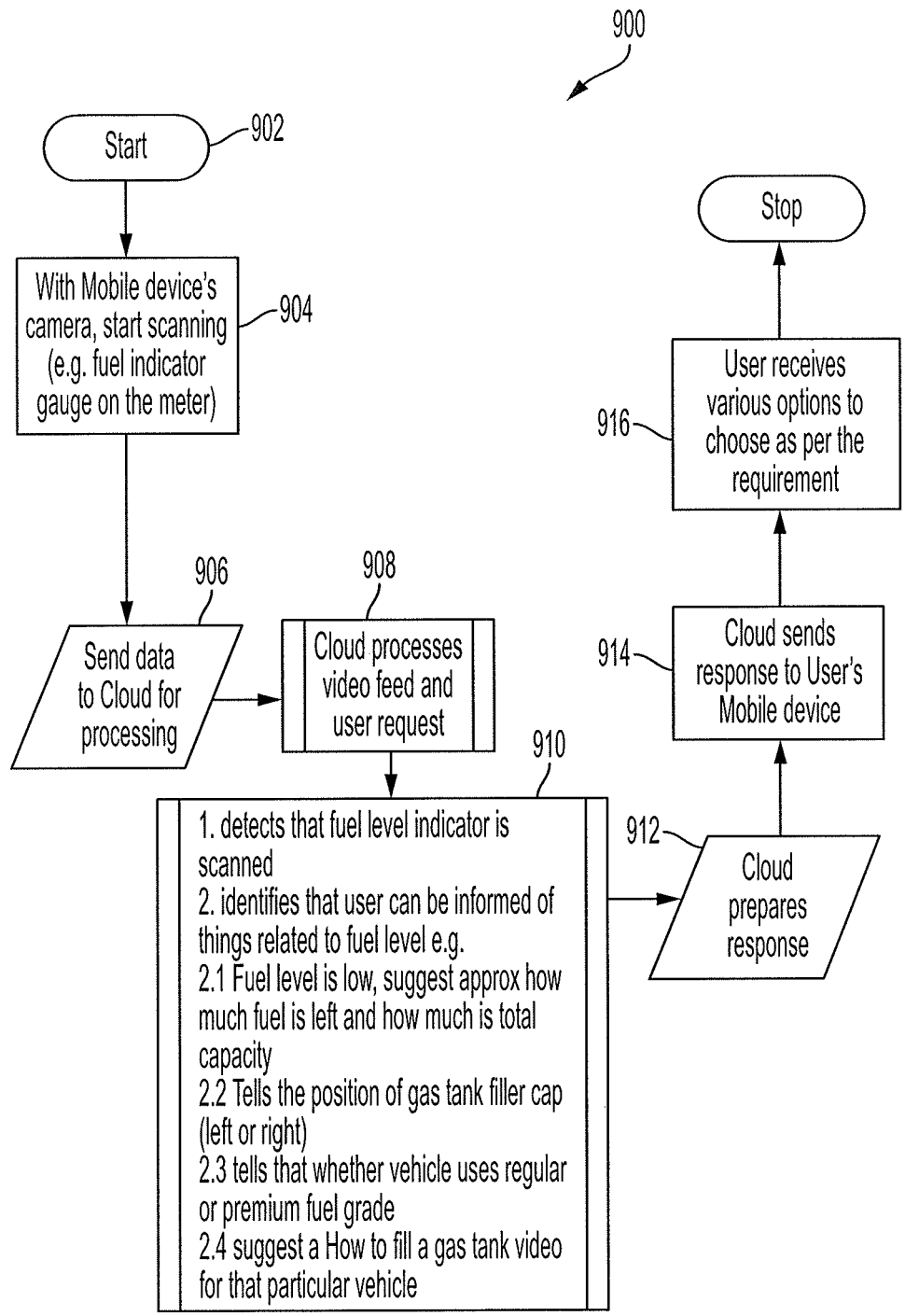

Turning now to FIG. 9, another method 900 may corresponds to an exemplary implementation of the method 300 of FIGS. 3A and 3B. The method 900 may begin in block 902.

In block 904, a mobile device may detect image data corresponding to a fuel indicator gauge on a dashboard. In block 906, the image data may be transmitted from the mobile device to a server.

In block 908, the server may analyze the image data.

In block 910, the server may determine that the image data corresponds to the fuel level indicator. The server may further identify various pieces of information corresponding to the fuel level indicator. For example, the server may identify that the fuel level is low and provide content indicating an approximation of a remaining amount of fuel in the fuel tank. The server may further provide content indicating the location of an opening to the fuel tank for refilling the fuel tank. The server may also provide content indicating a type of fuel used by the vehicle. The server may further provide content that includes directions for refilling the fuel tank.

In block 912, the server may prepare a response including the content. The response may be sent to the mobile device in block 914, and the mobile device may output the content in block 916.

Figure 10:
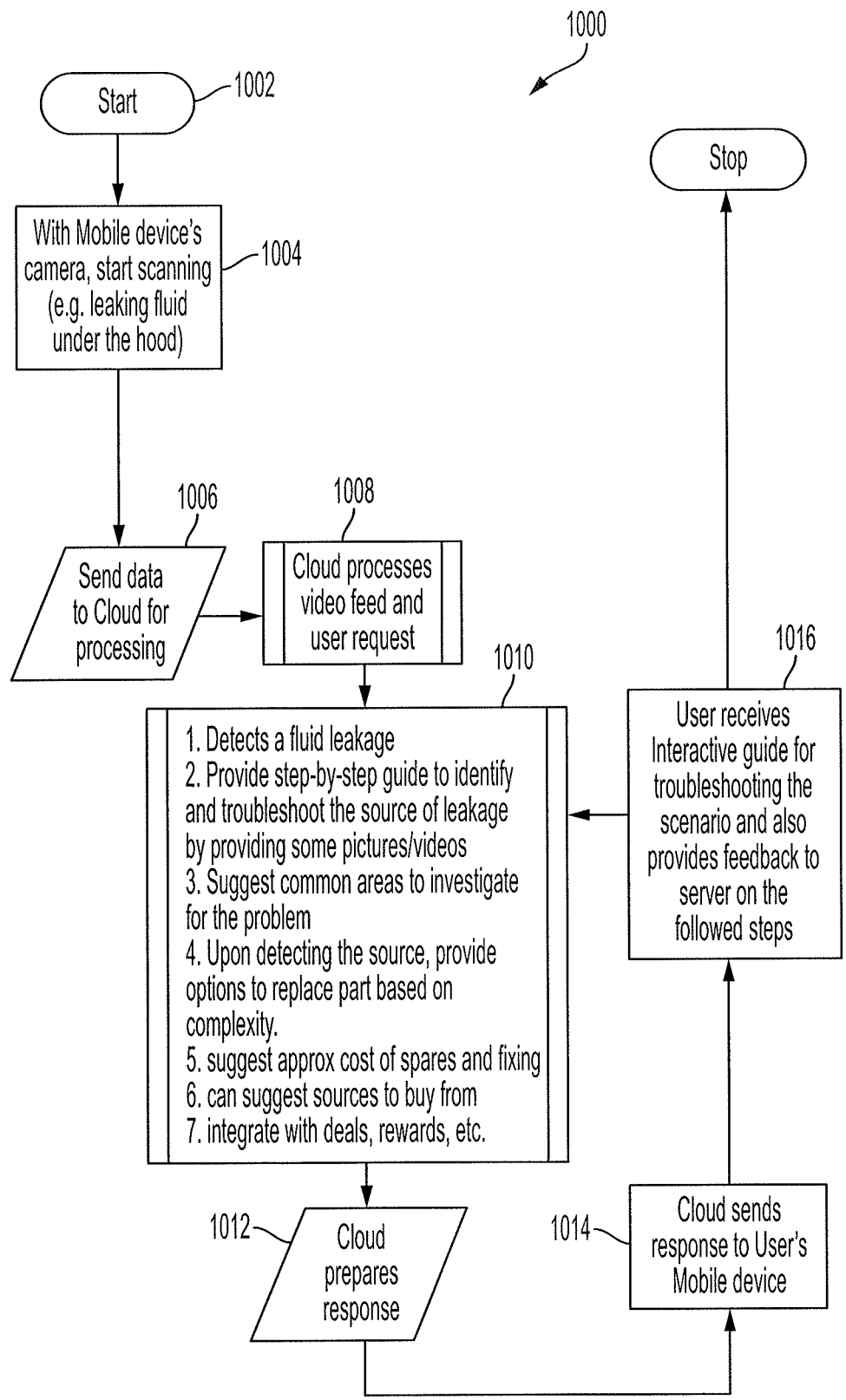

Turning now to FIG. 10, another method 1000 may be another exemplary implementation of the method 300 of FIGS. 3A and 3B. The method 1000 may begin in block 1002.

In block 1004, a mobile device may detect image data corresponding to leaking fluid under a hood of the vehicle. The image data may be transmitted to a server in block 1006.

In block 1008, the server may analyze the received image data.

In block 1010, the server may determine that the image data indicates a fluid leak under the vehicle hood. The server may further identify content including a step-by-step guide to identify and troubleshoot leaking fluid under a vehicle hood. The server may further identify content suggesting common areas which may be the source of the leaking fluid. The server may further identify the location of the leak (based on the original image data or later detected image data) and provide content including sources for new parts to fix the leak or how-to videos for repairing the part. The server may further determine an approximate cost of spare parts and/or for repair of the part, and may provide content including contact information for qualified professionals as well as locations for purchasing spare parts. In some embodiments, the server may integrate the content with deals, rewards, or the like or purchasing replacement parts or having the part repaired.

In block 1012, the server may prepare a response including the applicable content, and may transmit the response in block 1014.

In block 1016, the mobile device may receive an interactive guide for troubleshooting as the content. The user may take the steps indicated in the interactive guide and may provide feedback to the server via the mobile device. Based on this feedback, the server may identify additional applicable content or may provide next steps for troubleshooting the leak.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing vehicle information to a remote device, the system comprising:
    a network access device configured to communicate with the remote device;
    a memory configured to store content related to one or more vehicles; and
    a processor coupled to the network access device and the memory and configured to:
        receive a request for the vehicle information from the remote device via the network access device, the request including word data,
        determine that the request including the word data is insufficient for identifying at least one of (i) a model or a portion of a vehicle for which the vehicle information is requested or (ii) a type of information requested,
        transmit a request for additional information including image data to the remote device via the network access device, the request for the additional information being based on the determination that the request including the word data is insufficient,
        receive the additional information including the image data from the remote device via the network access device,
        identify the at least one of (i) the model or the portion of the vehicle or (ii) the type of information requested based on the request including the word data and the received additional information,
        identify applicable content from the stored content including a plurality of different pieces of information each corresponding to a different way to use or repair the vehicle based on the identified model of the vehicle, the identified portion of the vehicle, or the identified type of information requested, select one or more portions of the applicable content to transmit to the remote device, and control the network access device to transmit the selected one or more portions of the applicable content to the remote device.

2. The system of claim 1, wherein the word data includes at least one of text data or audio speech data, and the processor is further configured to identify the model of the vehicle, the portion of the vehicle, or the type of information requested based on the word data first and then based on the image data if the word data is insufficient.

3. The system of claim 1, wherein the processor is further configured to:

determine that a component in the portion of the vehicle is damaged based on the image data, and identify a repair document or a repair video as the applicable content when the component is damaged.

4. The system of claim 3, wherein the processor is further configured to:

determine that repair of the component is to be done by at least one qualified professional, and identify information corresponding to the at least one qualified professional including a professional repair service provider or at least one company associated with the at least one qualified professional as the applicable content when the repair of the component is to be done by the at least one qualified professional, the identified information including identifying information and contact information relating to the professional repair service provider.

5. The system of claim 1, wherein the processor is further configured to:

identify multiple applicable content pieces including the plurality of different pieces of information each corresponding to the different way to use or repair the vehicle, control the network access device to transmit an identifier of each of the multiple applicable content pieces to the remote device, receive a selection of a selected one of the multiple applicable content pieces from the remote device via the network access device, select the one or more portions of the applicable content including the selected one of the multiple applicable content pieces to transmit to the remote device based on the received selection, and control the network access device to transmit the selected one of the multiple applicable content pieces to the remote device.

6. The system of claim 1, wherein the processor is further configured to identify at least the portion of the vehicle for which the vehicle information is requested, and wherein the applicable content includes at least one of a remaining useful life of the portion of the vehicle, how-to information indicating how to use a component in the portion of the vehicle, or diagnostic information providing a diagnosis of the portion of the vehicle.

7. The system of claim 1, wherein the processor is further configured to:

control the network access device to transmit, to the remote device, a notification indicating that the additional information is requested and including a description of the additional information that is requested to the remote device, receive supplemental information from the remote device via the network access device, and identify the at least one of (i) the model or the portion of the vehicle or (ii) the type of information requested based on the supplemental information from the remote device.

8. The system of claim 1, wherein the processor is further configured to use an artificial intelligence (AI) algorithm to identify the type of information requested using the request for the vehicle information as an input.

9. The system of claim 1, wherein the content includes at least one of audio data, video data, or text data.

10. A system for providing vehicle information to a remote device, the system comprising:

a network access device configured to communicate with the remote device;

a memory configured to store content related to one or more vehicles; and a processor coupled to the network access device and the memory and configured to:

receive a request for the vehicle information from the remote device via the network access device, the request including word data, determine that the word data included in the request for the vehicle information is insufficient for identifying at least one of (i) a model or a portion of a vehicle for which the vehicle information is requested or (ii) a type of information requested, transmit a request for image data related to the requested vehicle information to the remote device via the network access device, the request for the image data being based on the determination that the word data is insufficient, receive the requested image data from the remote device via the network access device, identify the at least one of (i) the model or the portion of the vehicle or (ii) the type of information requested based on the word data and the image data, identify applicable content from the stored content including a plurality of different pieces of information each corresponding to a different way to use or repair the vehicle based on the identified model of the vehicle, the identified portion of the vehicle, or the identified type of information requested, select one or more portions of the applicable content to transmit to the remote device, and control the network access device to transmit the selected one or more portions of the applicable content to the remote device.

11. The system of claim 10, wherein the processor is further configured to identify the model of the vehicle, the portion of the vehicle, or the type of information requested based on the word data first and then based on the image data if the word data is insufficient.

12. The system of claim 10, wherein the processor is further configured to:

determine that a component in the portion of the vehicle is damaged based on the request for the vehicle information, and identify a repair document or a repair video as the applicable content when the component is damaged.

13. The system of claim 12, wherein the processor is further configured to:

determine that repair of the component is to be done by at least one qualified professional, and identify information corresponding to the at least one qualified professional including a professional repair service provider or at least one company associated with the at least one qualified professional as the applicable content when the repair of the component is to be done by the at least one qualified professional, the identified information including identifying information and contact information relating to the professional repair service provider.

14. The system of claim 10, wherein the processor is further configured to:
identify multiple applicable content pieces including the plurality of different pieces of information each corresponding to the different way to use or repair the vehicle,
control the network access device to transmit an identifier of each of the multiple applicable content pieces to the remote device,
receive a selection of a selected one of the multiple applicable content pieces from the remote device via the network access device,
select the one or more portions of the applicable content including the selected one of the multiple applicable content pieces to transmit to the remote device based on the received selection, and
control the network access device to transmit the selected one of the multiple applicable content pieces to the remote device.

15. The system of claim 10, wherein the processor is further configured to:
determine that additional information is needed to identify the at least one of (i) the model or the portion of the vehicle or (ii) the type of information requested,
control the network access device to transmit a notification indicating that the additional information is requested and including a description of the additional information that is requested to the remote device,
receive supplemental information from the remote device via the network access device, and
identify the at least one of (i) the model or the portion of the vehicle or (ii) the type of information requested based on the supplemental information from the remote device.

16. A method for providing vehicle information to a remote device, the method comprising:
receiving a request for the vehicle information from the remote device, the request including word data;
storing content related to one or more vehicles in a memory;
determining that the request including the word data is insufficient for identifying at least one of (i) a model or a portion of a vehicle for which the vehicle information is requested or (ii) a type of information requested;
transmitting a request for additional information including image data to the remote device in response to determining that the request including the word data is insufficient;
receiving the additional information including the image data from the remote device;
identifying the at least one of (i) the model or the portion of the vehicle or (ii) the type of information requested based on the request including the word data and the received additional information;
identifying applicable content from the stored content including a plurality of different pieces of information each corresponding to a different way to use or repair the vehicle based on the identified model of the vehicle, the identified portion of the vehicle, or the identified type of information requested;
selecting one or more portions of the applicable content to transmit to the remote device; and
controlling a network access device to transmit the selected one or more portions of the applicable content to the remote device.

17. The method of claim 16, wherein:
the word data includes at least one of text data or audio speech data; and
identifying the at least one of (i) the model or the portion of the vehicle or (ii) the type of information requested includes identifying the at least one of (i) the model or the portion of the vehicle or (ii) the type of information requested based on the word data first and then based on the image data if the word data is insufficient.

18. The method of claim 16, further comprising:
determining that a component in the portion of the vehicle is damaged based on the image data; and
identifying a repair document or a repair video as the applicable content when the component is damaged.

19. The method of claim 18, further comprising:
determining that repair of the component is to be done by at least one qualified professional; and
identifying information corresponding to the at least one qualified professional including a professional repair service provider or at least one company associated with the at least one qualified professional as the applicable content when the repair of the component is to be done by the at least one qualified professional, the identified information including identifying information and contact information relating to the professional repair service provider.

20. The method of claim 16, further comprising:
identifying multiple applicable content pieces including the plurality of different pieces of information each corresponding to the different way to use or repair the vehicle;
controlling the network access device to transmit an identifier of each of the multiple applicable content pieces to the remote device;
receiving a selection of a selected one of the multiple applicable content pieces from the remote device;
selecting the one or more portions of the applicable content including the selected one of the multiple applicable content pieces to transmit to the remote device based on the received selection; and
controlling the network access device to transmit the selected one of the multiple applicable content pieces to the remote device.

* * * * *